(12) United States Patent
Jonnala

(10) Patent No.: US 10,437,682 B1
(45) Date of Patent: Oct. 8, 2019

(54) EFFICIENT RESOURCE UTILIZATION FOR CROSS-SITE DEDUPLICATION

(71) Applicant: EMC Corporation, Hopkinton, MA (US)

(72) Inventor: Uday Jonnala, Cupertino, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 439 days.

(21) Appl. No.: 14/869,960

(22) Filed: Sep. 29, 2015

(51) Int. Cl.
| | |
|---|---|
| *G06F 16/20* | (2019.01) |
| *G06F 11/14* | (2006.01) |
| *H04L 29/08* | (2006.01) |
| *H04L 12/24* | (2006.01) |
| *G06F 16/27* | (2019.01) |
| *G06F 16/23* | (2019.01) |
| *G06F 16/182* | (2019.01) |

(52) U.S. Cl.
CPC ...... *G06F 11/1451* (2013.01); *G06F 11/1464* (2013.01); *G06F 16/182* (2019.01); *G06F 16/23* (2019.01); *G06F 16/27* (2019.01); *G06F 16/275* (2019.01); *H04L 41/12* (2013.01); *H04L 67/1095* (2013.01); *G06F 2201/84* (2013.01)

(58) Field of Classification Search
None
See application file for complete search history.

(56) References Cited

U.S. PATENT DOCUMENTS

| | | | | |
|---|---|---|---|---|
| 7,990,978 | B1 * | 8/2011 | Chamas | H04L 47/525 370/395.21 |
| 2008/0270436 | A1 * | 10/2008 | Fineberg | G06F 17/30097 |
| 2009/0313630 | A1 * | 12/2009 | Hori | G06F 8/67 718/102 |
| 2013/0151683 | A1 * | 6/2013 | Jain | G06F 3/0611 709/223 |
| 2014/0280779 | A1 * | 9/2014 | Paul | H04L 67/06 709/219 |
| 2017/0315876 | A1 * | 11/2017 | Dornquast | G06F 17/30174 |

* cited by examiner

*Primary Examiner* — Jau Shya Meng
(74) *Attorney, Agent, or Firm* — Womble Bond Dickinson (US) LLP

(57) ABSTRACT

Methods and apparatuses are described to provide a mechanism to improve replication performance by understanding available bandwidths of multiple source servers and load balancing the replication among the source servers based on fingerprints of data units to be replicated. A separate source server can be identified for one source server to replicate the data units to a target server. A replication request is sent from the one source server to the separate source server to identify the data units. A reply may be received from the separate source server to indicate that one or more of the data units are replicated from the separate source server. Subsequently, the remaining ones of the data units not indicated in the reply may be sent directly from the one source server to the target server without sending the one or more data units indicated in the reply.

23 Claims, 8 Drawing Sheets

| Site Node 401 | Bandwidth 403 | Replication Ref Count 405 |
|---|---|---|
| S1 | 100 MBps | 1 |
| S2 | 200 MBps | 0 |
| S3 | 50 MBps | 2 |
| S4 | 100 MBps | 0 |

Identifying, at a first source server, a second source server for replicating one or more data units to a target server, the second source server coupled with the target server, the second site sever capable of performing data replication to the target server 501

Sending a replication request from the first source server to the second source server, the replication request identifying the data units for replication 503

Receiving a reply to the replication request from the second source server, the reply indicating one or more of the data units are replicated from the second source server, remaining ones of the data units not replicated from the second source server for the replication request 505

Sending, subsequent to receiving the reply, at least one of the remaining ones of the data units from the first source server to the target server for the replication of the data units without sending the one or more of the data units indicated in the reply 507

Identifying one or more source servers in a cross site configuration to replicate one or more data units from a particular one of the source servers to a target server, each source server capable of performing data replication to the target server, each identified source server having available connection bandwidth to the target server  601

Associating separate portions of the data units with the identified source servers, wherein each identified source server stores an associated separate portion of the data units  603

Sending replication requests to the identified source servers, each replication request identifying one of the separate portions of the data units to associated one of the identified source servers  606

Collecting replies from the identified source servers in response to the replication requests, the replies indicating which of the data units are replicated from the identified source servers, wherein remaining ones of the data units are not replicated from the identified source servers according to the replies collected  607

Sending the remaining ones of the data units from the particular source server to the target server without sending the identified data units in the replies to allow concurrent use of the available connection bandwidths of the identified source servers to replicate the data units 609

Fig. 6

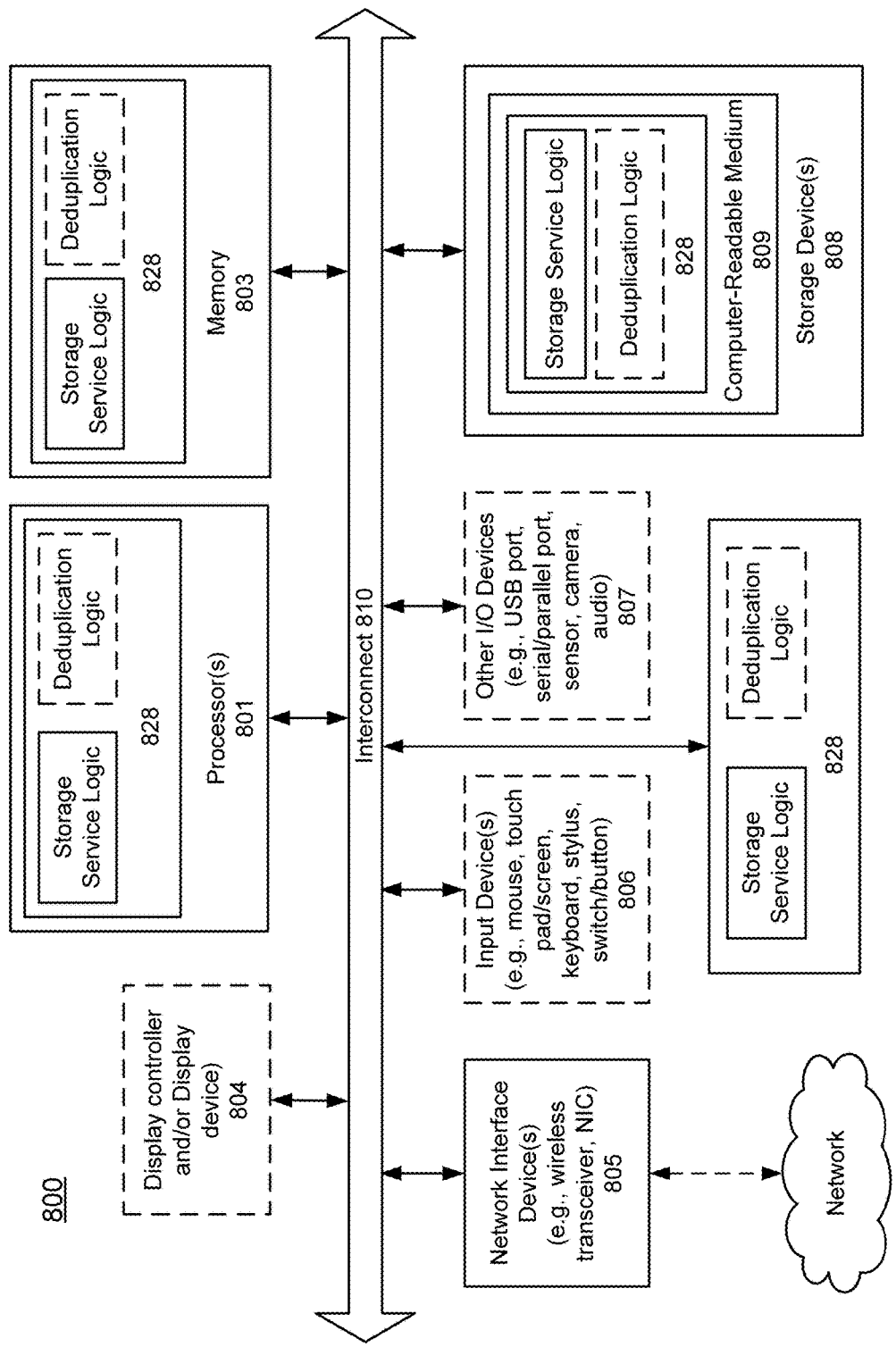

US 10,437,682 B1

EFFICIENT RESOURCE UTILIZATION FOR CROSS-SITE DEDUPLICATION

FIELD OF THE INVENTION

Embodiments of the present invention relate generally to data storage systems. More particularly, embodiments of the invention relate to data replication in a cross-site environment.

BACKGROUND

Increasing frequency of catastrophic events like hurricanes, floods, fire, etc., have raised the urgency to have disaster recovery procedures. One of the most crucial steps for disaster recovery is to have a copy of the data at a remote site. To improve reliability of disaster recovery and meet stringent recovery time objectives) imposed by each business, organizations are increasingly replicating backups to create this offsite copy of their critical data. Reducing the amount of backup and archive data replicated through deduplication and compression reduces the network bandwidth required, and makes replication over existing networks economically viable.

For example, cross-site deduplication can provide wide area network replication efficiencies comparable to the deduplication effect with aggregated benefits in a multi-site topology, such as multiple source systems to one destination system deduplication. Redundant data or common segments from different source systems may need to be sent only once. However, these source systems may be configured with different network bandwidths with the destination systems. As a result, if a common segment or data block is transferred to the destination system via a source system with a lower network bandwidth among these source systems, the overall performance of the cross-site deduplication may be negatively impacted.

Therefore, traditional replication system does not provide an optimized mechanism to utilize processing resources in a cross-site deduplication environment.

BRIEF DESCRIPTION OF THE DRAWINGS

Embodiments of the invention are illustrated by way of example and not limitation in the figures of the accompanying drawings in which like references indicate similar elements.

FIG. 4 shows an example of a site map indicating network capacities of site servers according to one embodiment of the invention;

FIG. 5 is a flow diagram illustrating an embodiment of a process to utilize processing resources in multiple site servers for cross-site deduplication according to one embodiment of the invention;

FIG. 6 is a flow diagram illustrating an alternative embodiment of a process to utilize processing resources in multiple site servers for cross-site deduplication according to one embodiment of the invention;

FIG. 8 is a block diagram illustrating a data processing system according to one embodiment.

DETAILED DESCRIPTION

Figure 1:
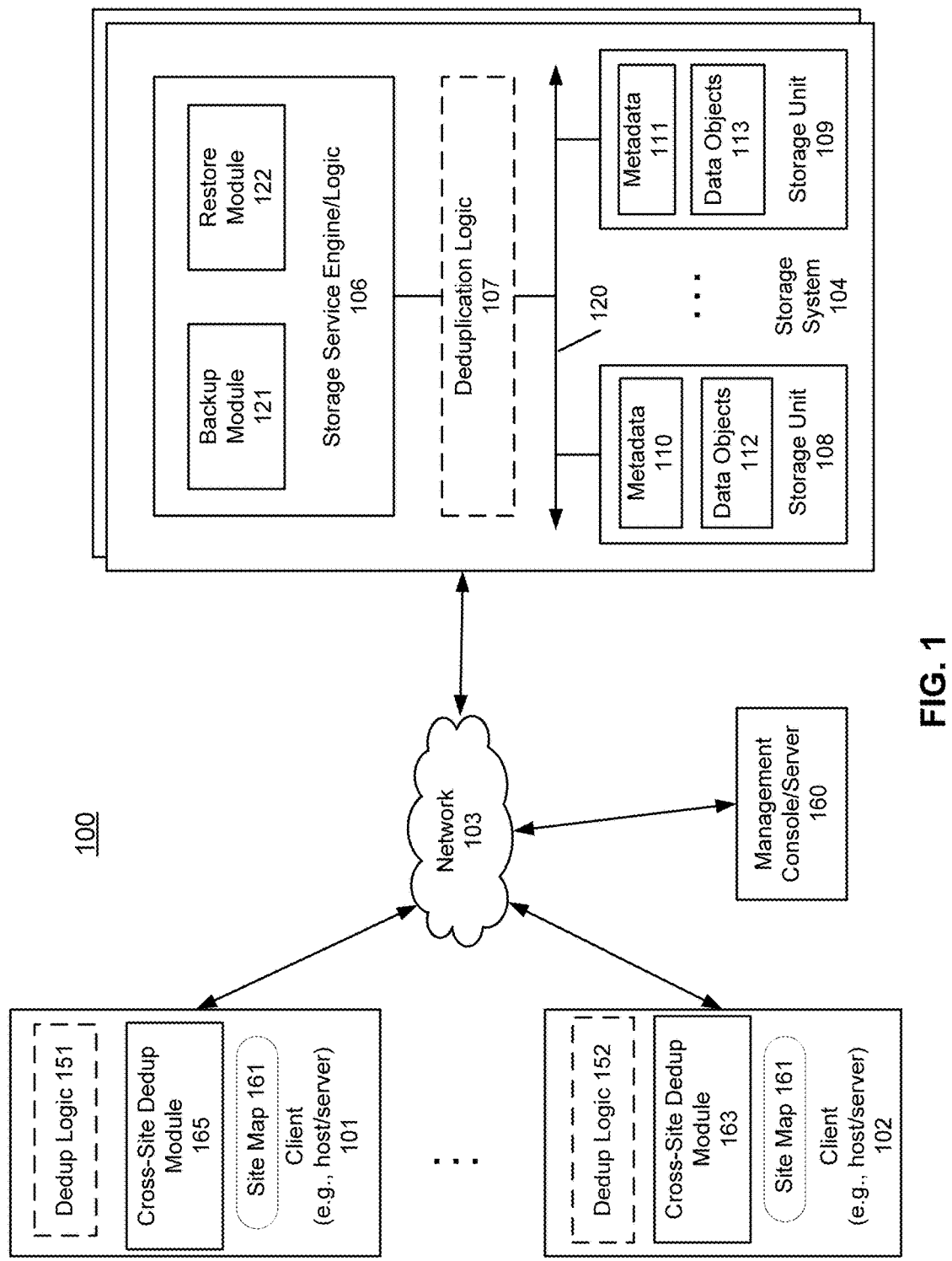
FIG. 1 is a block diagram illustrating a storage system according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

In one embodiment, performance of replication in cross-site deduplication can be improved via a mechanism to allow processing resources including network bandwidths in multiple source servers to be used to replicate local data for one source server. Cross-site deduplication may be performed when multiple sites (e.g. source servers or remote sites) replicate to the same destination system. A redundant segment previously transferred by any remote site, or as a result of local backup, may not be replicated again by another remote site. Cross-site deduplication can improve network efficiency across all sites.

In cross-site replication, multiple source servers (or site servers) may be commonly coupled to a single destination (or target) system or multiple destination systems. Network bandwidths may vary between different source servers in the cross-site configuration. The source server bandwidths may be adopted in cross-site deduplication. Local site objects (e.g. data segments) of one site (e.g. source server) may be replicated to a destination server from other sites to leverage available or higher bandwidths of those other sites. Cross-site replication speed can be improved with parallel replication across different source servers in variable bandwidth configurations.

In one embodiment, information related to current data processing capacity (e.g. including network bandwidth) of the source servers may be shared among each other. Fingerprints of data objects to be replicated may be communicated between source servers. Data replication from the source servers to the destination system can be load balanced based on the fingerprints communicated and the information shared about processing capacities of the source servers. The configuration of multiple source servers for cross-site replication can be dynamically utilized for achieving maximum bandwidth usage in the cross-site replication. The more the number of data objects matched in source servers with high available network bandwidths, the more the benefit in bandwidth utilization or replication time saved compared with replication from a single source server.

In one embodiment, the amount of data needed to be replicated from different source servers in this mechanism to perform replication for one source server can be fine-grained to some directories or files, based on the data segment or object (block level, file level) of the deduplication triggered for the replication. The mechanism may include a method to decide or select source servers to cooperate in replicating data objects for one source server in a cross-site configuration.

FIG. 1 is a block diagram illustrating a storage system according to one embodiment of the invention. Referring to FIG. 1, system 100 includes, but is not limited to, one or more client systems 101-102 communicatively coupled to storage system 104 over network 103. Clients 101-102 may be any type of clients such as a host or server, a personal computer (e.g., desktops, laptops, and tablets), a "thin" client, a personal digital assistant (PDA), a web enabled appliance, or a mobile phone (e.g., smartphone), etc. Alternatively, any of clients 101-102 may be a primary storage system (e.g., local data center) that provides storage to other local clients, which may periodically back up the content stored therein to a backup storage system (e.g., a disaster recovery site or system), such as storage system 104. Network 103 may be any type of networks such as a local area network (LAN), a wide area network (WAN) such as the Internet, a fiber network, a storage network, or a combination thereof, wired or wireless. Clients 101-102 may be in physical proximity or may be physically remote from one another. Storage system 104 may be located in proximity to one, both, or neither of clients 101-102. Clients 101-102 may be site servers to replicate locally stored data to a common destination server, such as storage system 104.

Storage system 104 may include or represent any type of servers or a cluster of one or more servers (e.g., cloud servers). For example, storage system 104 may be a storage server used for various different purposes, such as to provide multiple users or client systems with access to shared data and/or to back up (or restore) data (e.g., mission critical data). Storage system 104 may provide storage services to clients or users via a variety of access interfaces and/or protocols such as file-based access protocols and block-based access protocols. The file-based access protocols may include the network file system (NFS) protocol, common Internet file system (CIFS) protocol, and direct access file system protocol, etc. The block-based access protocols may include the small computer system interface (SCSI) protocols, Internet SCSI or iSCSI, and Fibre channel (FC) protocol, etc. Storage system 104 may further provide storage services via an object-based protocol and Hadoop distributed file system (HDFS) protocol.

In one embodiment, storage system 104 includes, but is not limited to, storage service engine 106 (also referred to as service logic, service module, or service unit, which may be implemented in software, hardware, or a combination thereof), optional deduplication logic 107, and one or more storage units or devices 108-109 communicatively coupled to each other. Storage service engine 106 may represent any storage service related components configured or adapted to provide storage services (e.g., storage as a service) to a variety of clients using any of the access protocols set forth above. For example, storage service engine 106 may include backup logic 121 and restore logic 122. Backup logic 121 is configured to receive and back up data from a client (e.g., clients 101-102) and to store the backup data in any one or more of storage units 108-109. Restore logic 122 is configured to retrieve and restore backup data from any one or more of storage units 108-109 back to a client (e.g., clients 101-102).

Storage units 108-109 may be implemented locally (e.g., single node operating environment) or remotely (e.g., multi-node operating environment) via interconnect 120, which may be a bus and/or a network (e.g., a storage network or a network similar to network 103). Storage units 108-109 may include a single storage device such as a hard disk, a tape drive, a semiconductor memory, multiple storage devices such as a redundant array system (e.g., a redundant array of independent disks (RAID)), a system for storage such as a library system or network attached storage system, or any other appropriate storage device or system. Some of storage units 108-109 may be located locally or remotely accessible over a network.

In response to a data file which is to be stored in storage units 108-109, according to one embodiment, deduplication logic 107 is configured to segment the data file into multiple segments (also referred to as chunks) according to a variety of segmentation policies or rules. Deduplication logic 107 may choose not to store a segment in a storage unit if the segment has been previously stored in the storage unit. In the event that deduplication logic 107 chooses not to store the segment in the storage unit, it stores metadata enabling the reconstruction of the file using the previously stored segment. As a result, segments of data files are stored in a deduplicated manner, either within each of storage units 108-109 or across at least some of storage units 108-109. The metadata, such as metadata 110-111, may be stored in at least some of storage units 108-109, such that files can be accessed independent of another storage unit. Metadata of each storage unit includes enough information to provide access to the files it contains.

Deduplication

Data deduplication is a process by which a data storage system can detect multiple identical copies of data and only keeps a single copy of that data, thus eliminating the redundant data by removing other copies of that data and thus improving storage utilization. In at least some systems, data deduplication requires iterating over set of data blocks in one or more storage extents, finding the blocks that contain identical information by processing digest information associated with each block and mapping the identical blocks to a single copy of the data. In such systems, an index table of unique digests is created to find commonality among the data set. When a deduplicated data block is updated with a new content, a new data block is created containing the new updated content. Mapping of the deduplicated block is then changed to point to the new data block and the deduplicated block no longer points to the single copy of the data. This process is referred to as reduplication.

Data deduplication can operate at a file or a block level. File deduplication eliminates duplicate files (as in the example above), but block deduplication processes blocks within a file and saves unique copy of each block. For example, if only a few bytes of a document or presentation or a file are changed, only the changed blocks are saved. The changes made to few bytes of the document or the presentation or the file do not constitute an entirely new file. The sharing of file system data blocks conserves data storage for storing files in a data storage system. The snapshot copy facility is a space saving technology that enables sharing of file system data blocks among versions of a file. On the other hand, a deduplication facility enables the sharing of file system data blocks within a file, among versions of a file, between versions of a file and unrelated files, and among unrelated files. Therefore, the deduplication facility eliminates from the data storage system any file system data blocks containing duplicative data content.

Deduplication of data happens in two logically distinct operations: detection and remapping. The detection operation identifies blocks containing the same data. The remapping operation updates address maps that record physical locations of logical units (LUNs) of data so that a single block of data is shared by multiple LUNs or by multiple positions within the same LUN. Detection is accomplished by building a database (e.g., index table) that maintains a digest (e.g., SHA, checksum) and a deduplication key for each data block. When two data blocks have the same digest they have a sufficiently high probability of containing the same data to warrant a bit-for-bit comparison to confirm they are exact duplicates.

A goal of deduplication logic 107 is to maintain only a single copy of each unique set of data within a data set. To achieve that goal, deduplication logic 107 finds data blocks that have not been deduplicated and processes data blocks for deduplication by computing digests for data blocks. A digest is a representation of contents stored in a data block. Further, the digest is mathematically computed (e.g., MD5, SHA-1, SHA-2) in such a way that, computationally, there is a very low or zero probability of finding two data blocks that have the same digest but different contents. If the digest for the data block is sent together with the data block, a recipient of the data block can compute a new digest from the received data block and can compare the new digest with the received digest to determine whether the received data block is valid. Additionally, a digest is stored in an index table in order to process data blocks within the data set for deduplication. Further, a deduplication key identifying a data block is also stored in index table along with the digest for the data block.

A deduplication key uniquely identifies a data block by storing information (such as logical address, physical address) of the data block. Deduplication logic 107 identifies data blocks that can potentially be deduplicated by comparing digests of data blocks with list of digests stored in the index table. Further, when data blocks are deduplicated after comparing digest information, deduplication logic 107 updates metadata of deduplicated data blocks. Additionally, deduplication logic 107 updates metadata of a data block when the data block is reduplicated.

In one embodiment, referring back to FIG. 1, any of clients 101-102 may further include an optional deduplication logic (e.g., deduplication logic 151-152) having at least a portion of functionalities of deduplication logic 107. Deduplication logic 151-152 are configured to perform local deduplication operations, respectively. For example, prior to transmitting data to storage system 104, each of the deduplication logic 151-152 may deduplicate the data into deduplicated segments and determine whether a particular deduplicated segment has already been stored in storage system 104. A deduplicated segment is transmitted to storage system 104 only if the deduplicated segment has not been stored in storage system 104.

For example, when client 101 is about to transmit a data stream (e.g., a file or a directory of one or more files) to storage system 104, deduplication logic 151 is configured to deduplicate the data stream into deduplicated segments. For each of the deduplicated segments, client 101 transmits a fingerprint or representative of the deduplicated segment to storage system 104 to determine whether that particular deduplicated segment has already been stored in storage system 104. A deduplicated segment that has been stored in storage system 104 may be previously received from the same client 101 or from another client such as client 102. In response to a response from storage system 104 indicating that the segment has not been stored in storage system 104, that particular segment is then transmitted over to the storage system 104. As a result, the network traffic or bandwidth and the processing resources required can be greatly reduced.

Cloud-Based/Virtualized Storage

In one embodiment, storage system 104 further includes a storage manager or storage controller (not shown) configured to manage storage resources of storage system 104, such as storage space and processing resources (e.g., processor, memory, network resources). The storage manager or controller may be accessed by an administrator of management console or server 160 remotely via a management or configuration interface (not shown). The administrator can provision and manage storage resources based on a set of policies, rules, and/or service level agreements. The storage resources may be virtualized into a pool of virtual storage resources, where underlying physical storage resources represented by the corresponding virtual storage resources may be implemented locally, remotely (e.g., hosted by another storage system), or both. The virtual storage resources can be provisioned, allocated, and/or defined by an administrator or automatically by the storage manager based on a set of software-defined policies. The virtual storage resources may be represented in one or more virtual machines (e.g., virtual storage systems) managed by one or more virtual machine managers (VMMs). Each of the virtual machines can be provisioned to provide a particular type of storage services (e.g., file-based, block-based, object-based, or HDFS) to a client based on a storage policy or service level agreement associated with that particular client as part of software-defined storage services.

Replication

A replicator replicates an original file system on a replicated file system. The replicated file system can be accessed by both the replicator and clients. To perform file replication, the replicator may create, delete or modify files on the replicated file system. In some embodiments, clients can read files on the replicated file system, but may not create, delete or modify files. In some embodiments, the replicator duplicates the replicated file system based on the original file system during initialization. In some embodiments, to efficiently initialize the replicated file system, the original file system is copied to the replicated file system via a network connection or using removable storage media such as backup tapes or optical storage discs.

In some embodiments, data segments included in the original file system are copied to the replicated file system via removable storage media and initialization is completed via the network. The replicator updates changes to the original file system on the replicated file system, keeping the two file systems synchronized. The replicator may be implemented as a process and/or device separate from the storage systems and/or file systems, a process and/or device that is a part of one or both of the storage systems and/or file system, or any other appropriate means. For example, in some embodiments, the replicator is a standalone device capable of communicating with the file systems. It determines the necessary updates by communicating with the original file system, and sends the updates to the replicated file system. The replicated file system is configured to answer queries, accept the updates, and modify the contents in the file system accordingly. In some embodiments, the replicator's functions are implemented as separate processes on the storage systems.

It is possible to represent files in other ways, such as using a mixture of byte sequences and references to byte sequences in other files. The byte sequences are treated as data segment. The identifiers used to reference the segments are substantially shorter than the segments themselves. Therefore, using identifiers allows more efficient use of available storage space. In some embodiments, the data segments and data segment identifiers are replicated on the replicated file system. In some embodiments, metadata of files are also updated. As used herein, metadata includes data associated with various attributes of the file, such as file name, file length, date stamp, permission, whether a file has been removed from the current file system, or whether a file has been renamed, etc.

In some embodiments, only the files that have been updated or newly referenced are replicated. A file is deemed to have been updated if it has been modified in some way since the last replication, such as having been edited, created, renamed, deleted, or having a permission change, etc. If the file has not been updated, nothing needs to be done to it in terms of replication. Any data segment that has been previously stored on the replicated file system but is newly referenced by the file being processed is located. In some embodiments, a data segment is deemed to be newly referenced if it was not referenced by the file at the time of the last replication; as a data segment that has been added or modified since the last replication.

In some embodiments, a data segment is deemed to be newly referenced if it was never referenced by the file during the file's replication history, or was not referenced within some number of replications. A data segment may be previously stored on the replicated file system, but is still newly referenced by the file if the data segment was previously stored on the replicated file system by another file, by a client writing to the replicated file system, or by some other preloading/initialization mechanism. Since the data segments have been previously stored, they do not need to be replicated again on the replicated file system. Thus, greater efficiency in replication is achieved, especially in file systems where multiple files share a large amount of identical data. How to locate these previously stored data segments are discussed in more detail below. Further, data segments that have not been previously stored on the replicated file system are located and replicated on the replicated file system. It is possible in some situations that all the data segments included in the file have been previously stored on the replicated file system therefore no additional replication is necessary. It is also possible that there is no previously stored data segment and all the data segments in the file need to be replicated.

In some embodiments, a log record is used to track the file system operations, recording file updates as they occur. Depending on implementation, the entries in the log record may include segment references, content handles, metadata, and other information that can be used for executing operations to synchronize the replicated file system with the original file system. There are a number of ways a log entry is generated, including every time an event (such as file write) occurs, after several events occur, or at a predetermined frequency. In some embodiments, to capture more update information with fewer log entries, each log entry is generated only when a key event occurs, such as when a file closes, after a predetermined idle period has lapsed, or when a snapshot of the file system is created, etc. During replication, the log record is processed, and updated files are determined based on log entries indicating file update operations such as file modification, file creation, etc.

In some embodiments, a snapshot is taken immediately before a replication starts. The snapshot records information of the file system at a point in time. It may be a snapshot of the entire file system, or a snapshot of one or more individual files. The snapshot may include information such as data segment references, content handles, etc. In some embodiments, prior to the next replication operation, the current states of the system are compared to a snapshot of the system to determine which files have been updated. In some embodiments, the current states of a file are compared to a snapshot of the file to determine whether the file has been updated.

In processing data segments, there are a number of ways to locate data segments that have not been stored previously on the replicated file system, some of which are described below although any other appropriate technique may be used. In some embodiments, log records are used. Log entries record operations on the original file system. In some embodiments, when a file is updated, a log entry including information about the file's data segment references is created. Offsets of the new data segment references, and other information that may assist in file replication are also recorded as appropriate. During replication, based on the log records of the new data segment references, it is determined whether the data segment being referenced has been stored already.

In some embodiments, upon receiving a query, the data segment reference on the replicated file system is looked up by the replicator or the replicated file system in a database of stored data segment identifiers, to determine whether such a data segment has been stored previously, and provides a response based on the lookup result. In some embodiments, the data segment reference under evaluation is compared with the data segment references known at the time of last replication. The comparison can be carried out by the original file system or by the replicator. If the data segment reference can be found in existing data segment references, it indicates that the corresponding data segment has already been stored. Otherwise, the corresponding data segment may not have been stored and may need to be replicated. In some embodiments, all such segments are replicated. In other embodiments, a query of the replicator or replicated file system determines whether the segment is replicated or not as described above. In all cases, many segments are not replicated even though new references to those segments are. Thus, the available bandwidth of the storage systems and the network connecting them is more efficiently utilized.

In some embodiments, when a file is updated, a log entry including information about the file's content handle is created. In some embodiments, to reduce the amount of processing, a log entry including content handle information is created after multiple updates, or upon certain key event such as when a file is closed. The content handle indirectly references the data segments included in the file and may be analyzed to obtain data segment references.

In one embodiment, clients 101-102 can maintain site map 161 describing information related to site topology for cross-site replication from multiple source servers, such as clients 101-102 to one destination server, such as storage system 104. Site map 161 may indicate current availability of processing resources, such as network capacities to storage system 104, for each client. Clients 101-102 may include logic to make use of available network bandwidths which are currently idle in other clients to replicate local data to storage system 104.

Figure 2:
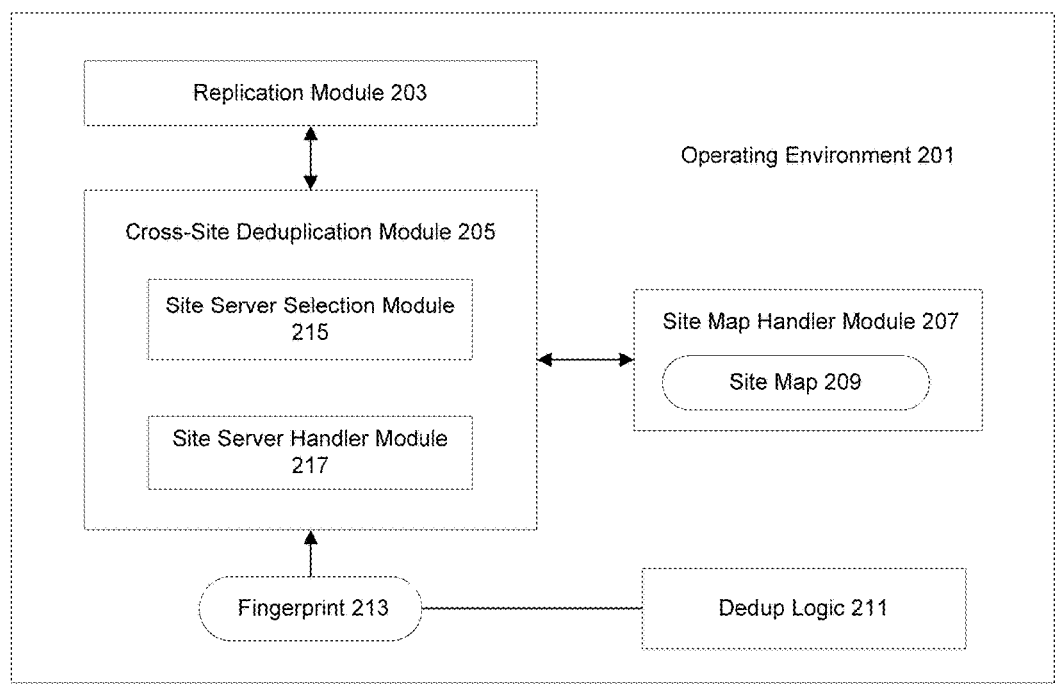
FIG. 2 is a block diagram illustrating system components for cross-site deduplication according to one embodiment of the invention.

FIG. 2 is a block diagram illustrating system components for cross-site deduplication according to one embodiment of the invention. For example, system 200 may be hosted in clients 101-102 of FIG. 1. Operating environment 201, such as an operating system running in a server device, may include dedup (or deduplication) logic 211 to perform deduplication operations similar to those performed by dedup logic 151, 152 of FIG. 1. Dedup logic 211 may generate fingerprint 213 as a result of the deduplication operations. Fingerprint 213 may include a structured data specifying which data segments or data objects locally stored in system 200 (e.g. via a coupled storage device or file system) need to be replicated to a destination storage system, such as storage system 104 of FIG. 1, in a cross-site replication environment.

In one embodiment, cross-site deduplication module 205 (e.g. based on cross-site dedup module 163, 165 of FIG. 1) can selectively request other source servers to replicate data segments indicated in fingerprint 213 based on site topology information of site map 209 to utilize available network bandwidths of multiple source servers. Site map handler module 207 can provide a synchronization mechanism with other source servers to keep information included in site map 209 fresh and up to date. For example, site map handler module 207 can fetch a current copy of site map 209 from a master source server which may centrally monitor processing statuses (e.g. include available processing resources or jobs currently performed, load level, etc.) of each source server.

In one embodiment, site server selection module 215 can determine which source server(s) to send replication requests for data segments specified in fingerprint 213 based on various criteria. For example, site map 209 may indicate whether a source server is currently idle or busy performing replication works. Site map 209 may also indicate available network bandwidth of a network connection from a source server to a destination server. Site server selection module 215 may select those source servers based on whether a source server is currently idle, the amount of available network bandwidth associated, or other applicable criteria, etc. In one embodiment site server selection module 215 may select source servers which are currently idling with available network bandwidth above a certain threshold value (e.g. larger than network bandwidth of system 200). Alternatively or optionally, site server selection module 215 can identify a source server with a largest available network bandwidth among currently idled source servers.

Site server handler module 217 can exchange replication request, inquiry or reply messages with other source servers. For example, site server handler module 217 may send replication inquiries to one or more selected source servers to identify desired data segments to replicate. In response, site server handler module 217 may receive replies indicating which of the desired data segments are available for replication from one or more of the selected source servers. Site server identification module 215 can determine which of the data segments in fingerprint 213 should be dedicated to which of the selected source servers to replicate. In one embodiment, one data segment may be dedicated to at most one of the selected source servers. Site server selection module 215 may make dedication decisions based on load balancing considering available bandwidths of the selected source servers and system 200.

Site server handler module 217 can send replication request identifying desired data segments to replicate to a selected source server. The desired data segments identified in a replication request may be based on fingerprint 213 and/or data segment dedication decisions made via site server selection module 215. In response, site server handler module 217 may receive or collect acknowledgement replies from the selected source servers to indicate which requested data segments are to be replicated by the selected source servers. The remaining data segments (e.g. not indicated in the acknowledgement replies) may be replicated directly from system 200 to the destination system via replication module 203.

In some embodiments, site server handler module 217 may receive cross-site replication requests and/or inquiries including fingerprints identifying data units replicate for other source servers. In response, site server handler module 217 may inspect which of the data units indicated in the received fingerprints are available locally. Site server handler module 217 may generate reply messages indicating which of the requested data units are available to be replicated from system 200 for other source servers. In some embodiments, site server handle module 217 may request replication operations on requested data units via replication module 203. Site server handler module 217 may generate an acknowledgement message indicating replication of certain data units are completed or ready to be completed (i.e. before the indicated replication is completed).

Figure 3:
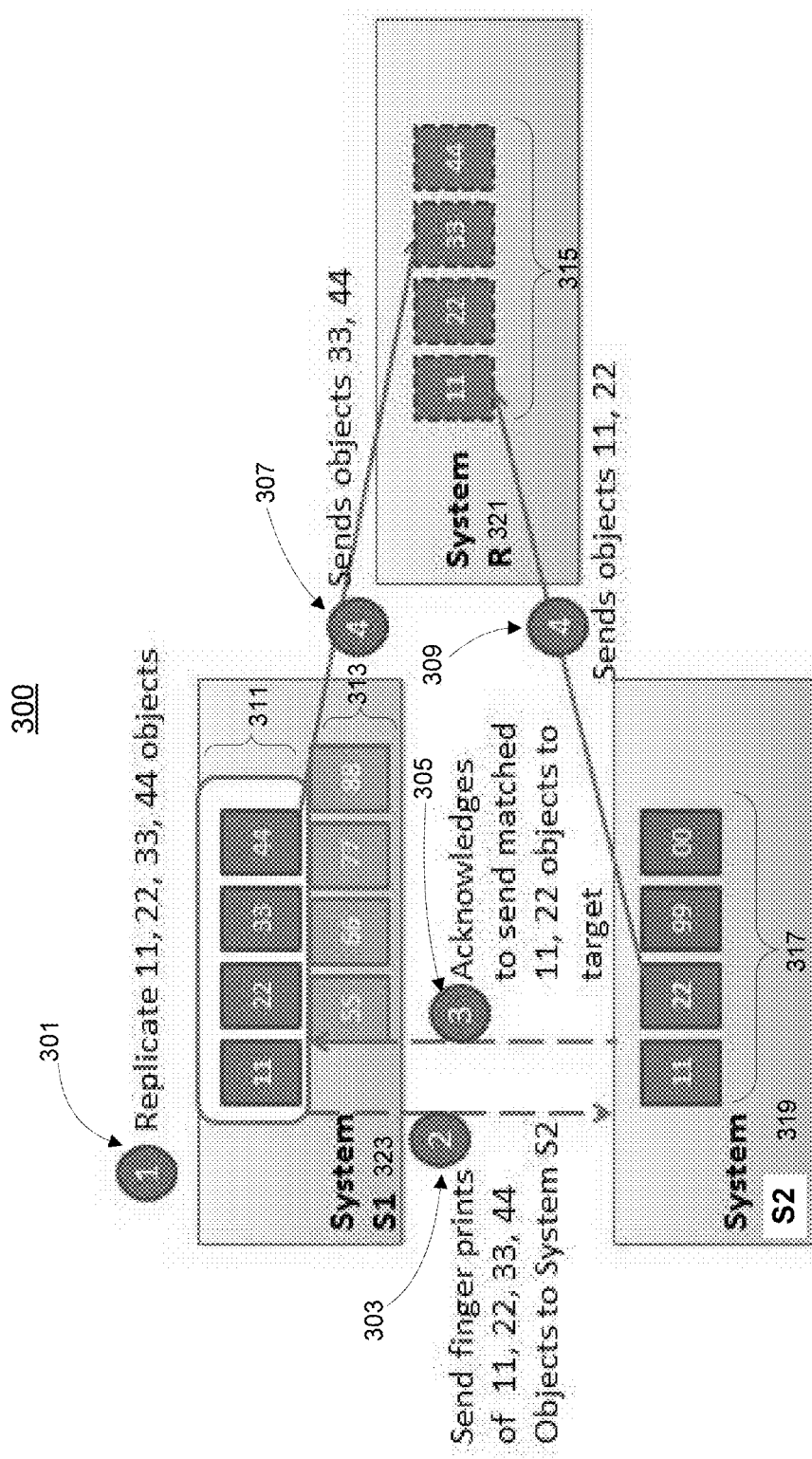
FIG. 3 is a sequence diagrams illustrating exemplary transactions among site servers and a destination server according to one embodiment of the invention.

FIG. 3 is a sequence diagram illustrating exemplary transactions among site servers and a destination server according to one embodiment of the invention. Sequence 300 may be based on a cross-site configuration, such as clients 101-102 and system 104 of FIG. 1. As an illustration, S1 323, S2 319 and R 321 may be configured as two source servers and one destination server of a cross-site configuration in a two-to-one topology. R321 may be the destination for source data replicating from sources S1 323 and S2 319.

At sequence 301, a replication may be triggered from S1 323 for data segments (or objects) 311. Site map information about the cross-site topology and corresponding bandwidths from source sites (e.g. S1 323, S2 319) to destination site (e.g. R 321) may be available at S1 323. In one embodiment, S1 323 can understand that S2 323 has better bandwidth than itself. The network bandwidth between S1 323 and R 321 may be low compared to the network bandwidth between S2 319 and R 321 at the time of sequence 301. It would take longer time to replicate same data from S1 323 to R 321 than from S2 319 to R 321.

At sequence 303, S1 323 may send a deduplication request including fingerprint identifying data segments 11, 22, 33, 44 311 to S2 319 based on the site map information. The deduplication request may cause S2 319 to check matched fingerprints or matched data segments. For example, S2 313 may find that data segments 11, 22 are present in data segments 317 locally stored in S2 313.

At sequence 305, after finding the matched data segments in the fingerprint received from S1 323, S2 319 can send an acknowledgement reply to S1 323. The reply may indicate that data segments 11, 22 are matched in S2 319. In one embodiment, S2 319 may proceed replicating matched data segments 11 to R 321, at sequence 4 309. Substantially concurrently, S1 323 may replicate or send the remaining data segments 33, 44 to R 321 subsequent to receiving the acknowledgement reply from S2 319.

FIG. 4 shows an example of a site map indicating network capacities of site servers. For example, table 400 may be included in site map 161 of FIG. 1. Map 400 may include central bandwidth information (site bandwidth table) maintained by all the systems or nodes in a cross-site configuration. Map 400 may include information on each site node (e.g. source server) such as configured network bandwidth, and current counts of replication jobs or tasks active. When a replication request is triggered in a system, it may refer to the site bandwidth table and figure out which systems in the cross-site replication configuration have more network bandwidths and less replication works active at this moment and select these systems to check for matched data objects (or deduplicated objects) for replication.

In some embodiments, system S1 323 of FIG. 3 can select system S2 319 to send replication request based on information included in table 400. Column site node 401 may list multiple source servers or site servers S1, S2, S3 and S4 in a cross-site configuration. Column bandwidth 403 may indicate configured network bandwidth between each source server and a common destination server, such as R 321 of FIG. 4. Replication ref count 405 may indicate current replication jobs active for each source server. In one embodiment, the network bandwidth of a source server will not be available if the corresponding source server is currently active with any replication job. Thus, according to map 400, S1 can identify or select source servers S2 and S4 as for sending replication request as S3 is busy performing two replication tasks.

FIG. 5 is a flow diagram illustrating an embodiment of a process to utilize processing resources in multiple site servers (or source servers) for cross-site deduplication. Exemplary process 500 may be performed by a processing logic that may include hardware (circuitry, dedicated logic, etc.), software (such as is run on a dedicated machine), or a combination of both. For example, process 500 may be performed by some components of system 100 of FIG. 1. At block 501, for example, the processing logic of process 500 may identify, at a first source server in a cross-site configuration, a second source server of the cross-site configuration for replicating data units from the first source server to a target server. Source servers in the cross-site configuration may be coupled to the target server for data replication.

A data unit may be a data object, a data segment, a fixed sized partition of a storage component or other applicable storage units. These data units may be part of local data, such as files and directories, stored in storage devices, such as non-volatile storage devices, coupled to the first source server. Which data units to replicate from the first source server may be determined based on a deduplication mechanism via the target server. For example, the processing logic of process 500 may generate a fingerprint describing a set of data units to be replicated to the target server based on deduplication operations. The set of data units may include the one or more data units which may be replicated from other source servers of the cross-site configuration.

In one embodiment, the cross-site configuration may include multiple source servers or site servers separately coupled to the target server via common or different network connections. Each source server may be capable of performing data replication operations to copy local data to the target server. A runtime state of the cross-site configuration may include an underlying infrastructure configuration of each server (e.g. source server, target server, network connections, etc.) and current data processing activities on the site servers.

The processing logic of process 500 can dynamically maintain a topology map, such as site map 161 of FIG. 1, describing the runtime state of the cross-site configuration. The topology map may identify the source servers of the cross-site configuration. The second source server may be identified at the first source server for replication based on the topology map. In certain embodiments, the source servers in the cross-site configuration may include a master server which can monitor runtime states of the source servers to update the topology map dynamically. The processing logic of process 500 can retrieve or receive the topology map from the master server.

The processing logic of process 500 may select eligible source servers to assist the replication of the data units in the cross-site configuration based on the topology map. The eligible source servers selected may include the second source server. For example, the topology map can indicate whether a source server is currently performing data replication to the target server, and wherein an eligible source server is not currently performing the data replication to the target server.

In some embodiments, the topology map may indicate a network bandwidth associated with a network connection between a source server and the target server. The eligible source servers may be selected according to the connection bandwidth associated with each source server. For example, the processing logic of process 500 may include a preference for a source server with a larger network bandwidth and another source server with a smaller network bandwidth.

In some embodiment, a source server may not be selected as eligible if this source server is associated with a network bandwidth smaller than a threshold value. The processing logic of process 500 may determine the threshold value based on, for example, the current network bandwidth associated with the first source server where the data units to be replicated are locally stored.

The processing logic of process 500 can determine an ordering relationship among the eligible source servers according to amounts of network bandwidth associated with the eligible source servers to the target server for replicating the data units from the first source server. The second source server may be identified for the replication with a highest amount of network bandwidth among the eligible source servers according to the ordering relationship.

In one embodiment, the processing logic of process 500 can send inquiry messages to the eligible source servers, each inquiry message identifying the set of data units for replication. The processing logic of process 500 may collect response messages from the eligible source servers in response to the inquiry messages. Each response message may be received from one of the eligible source servers to indicate which of the set of data units would be available or to be replicated from the one eligible source server. For example, a particular response message received from the second source server may indicate that one or more data units are available in the second source server.

The processing logic of process 500 may identify one or more of the eligible source servers to replicate separate portions of the set of data units to be replicated. For example, the identified eligible source servers may include the second source server. Each identified eligible source servers may replicate one separate portion of the set of data units.

At block 503, the processing logic of process 500 may send a replication request from the first source server to the second source server. The replication request may indicate or identify which data units to be replicated to the target server. Each data unit may be uniquely identifiable for the second source server to determine whether it has corresponding data units stored locally.

In some embodiments, the processing logic of process 500 may send inquiry messages to the second source server. The inquiry message may identify the data units to be replicated from the first source server. In response, the second source server may respond with messages indicated which among the data units identified are available for replication from the second source server. The replication request may be generated based on the messages received from the second source server in response to the inquiry messages.

At block 505, the processing logic of process 500 may receive a reply message to the replication request from the second source server. The reply message may indicate one or more (or a portion) of the data units to be (or have been) replicated from the second source server. The remaining ones of the data units which are not indicated in the reply message may not be replicated from the second source server for the replication request.

In response to the reply received from the second source server, the processing logic of process 500 may send an updated replication request from the first source server to a third source server of the cross-site configuration. The third source server may be ranked next to the second source server according to the ordering relationship determined, for example, based on associated network bandwidths. The updated replication request may be generated according to the reply message received from the second source server. The updated replication request may identify the remaining ones of the data units (e.g. which are not replicated from the second source server) desired to be replicated from the third source server. In other words, the updated replication request does not identify those data units replicated (or to be replicated) from the second source server. The processing logic of process 500 may receive a separate reply from the third source server to indicate which ones of the remaining data units are (or to be) replicated from the third source server.

At block 507, the processing logic of process 500 may send the at least one of the remaining ones of the data units from the first source server to the target server. For example, the processing logic of process 500 may decide which of the data units are not replicated by other source servers, such as the second source server, the third source server, etc., before sending or copying the at least one of the remaining one of the data units.

The processing logic of process 500 may receive replies from other source servers of the cross-site which have been requested (e.g. via replication requests) to replicate at least a portion of the data units. Subsequently, the processing logic of process 500 may determine the at least one of the remaining ones of the data units need to be replicated directly from the first source server to the target server based on the replies received. The processing logic of process 500 may not replicate those data units replicated by other source servers as requested. Different portions of the data units may be replicated from the first source server, the second source server or other applicable source servers in the cross-site configuration substantially concurrently to leverage available network bandwidths across different source servers.

In one embodiment, the processing logic of process 500 may send multiple replication requests to the identified source servers to separately replicate separate portions of the set of data units. These multiple replication requests may include the replication request to the second source server. These multiple replication requests may be sent out substantially concurrently.

In response to the multiple replication requests sent from the first source server, the processing logic of process 500 may receive multiple replies from the identified source servers. These replies may include the reply from the second source server. The processing logic of process 500 may determine which of the set of data units are to be replicated directly from the first source server. For example, the processing logic of process 500 may determine that at least one of the remaining ones of the data units are not replicated by any other source servers in the cross-site configuration and need to be replicated directly from the first source server.

FIG. 6 is a flow diagram illustrating an alternative embodiment of a process to utilize processing resources in multiple site servers for cross-site deduplication. Exemplary process 600 may be performed by a processing logic that may include hardware (circuitry, dedicated logic, etc.), software (e.g. running on a dedicated machine), or a combination of both. For example, process 600 may be performed by some components of system 100 of FIG. 1. At block 601, for example, the processing logic of process 600 may identify one or more source servers in a cross-site configuration to replicate one or more data units from a particular one of the source servers to a target server.

The data units may be stored locally at the particular source server to be replicated to the target server according to a deduplication mechanism. Each source server may be capable of performing data replication operations to the target server. Each identified source server may have available bandwidth connected to the target server for replication. For example, the source servers may be identified based on a topology map describing current runtime states of processing resources in the cross-site configuration.

At block 603, the processing logic of process 600 may associate separate portions of the data units (to be replicated) with the identified source servers. The processing logic of process 600 may exchanges messages with each identified source server to confirm that a portion of the data units associated with an identified source server is locally stored or available at the identified source server.

At block 605, the processing logic of process 600 may send replication requests to the identified source servers to replicate associated portions of the data units. Each replication request may identify one separate portion of the data units associated with one of the identified source servers. Subsequently at block 607, the processing logic of process 600 may collect replies from the identified source servers responding to the replication requests. Each reply from a source server may indicate which of the data units are replicated from the replying source server. Based on the replies collected, the processing logic of process 600 may determine remaining ones of the data units which are not replicated from any identified source server requested.

At block 609, the processing logic of process 600 can send the remaining ones of the data units directly from the particular source server to the target server. Thus, those data units identified in the replies received from those identified source servers are not replicated from the particular source server. Available connection bandwidths of multiple source servers in the cross-site configuration may be concurrently utilized to replicate data units of one single source server.

Note that some or all of the components as shown and described above (e.g. cross-site dedup module 163, cross-site dedup module 165 of FIG. 1, cross-site deduplication module 205) may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 7:
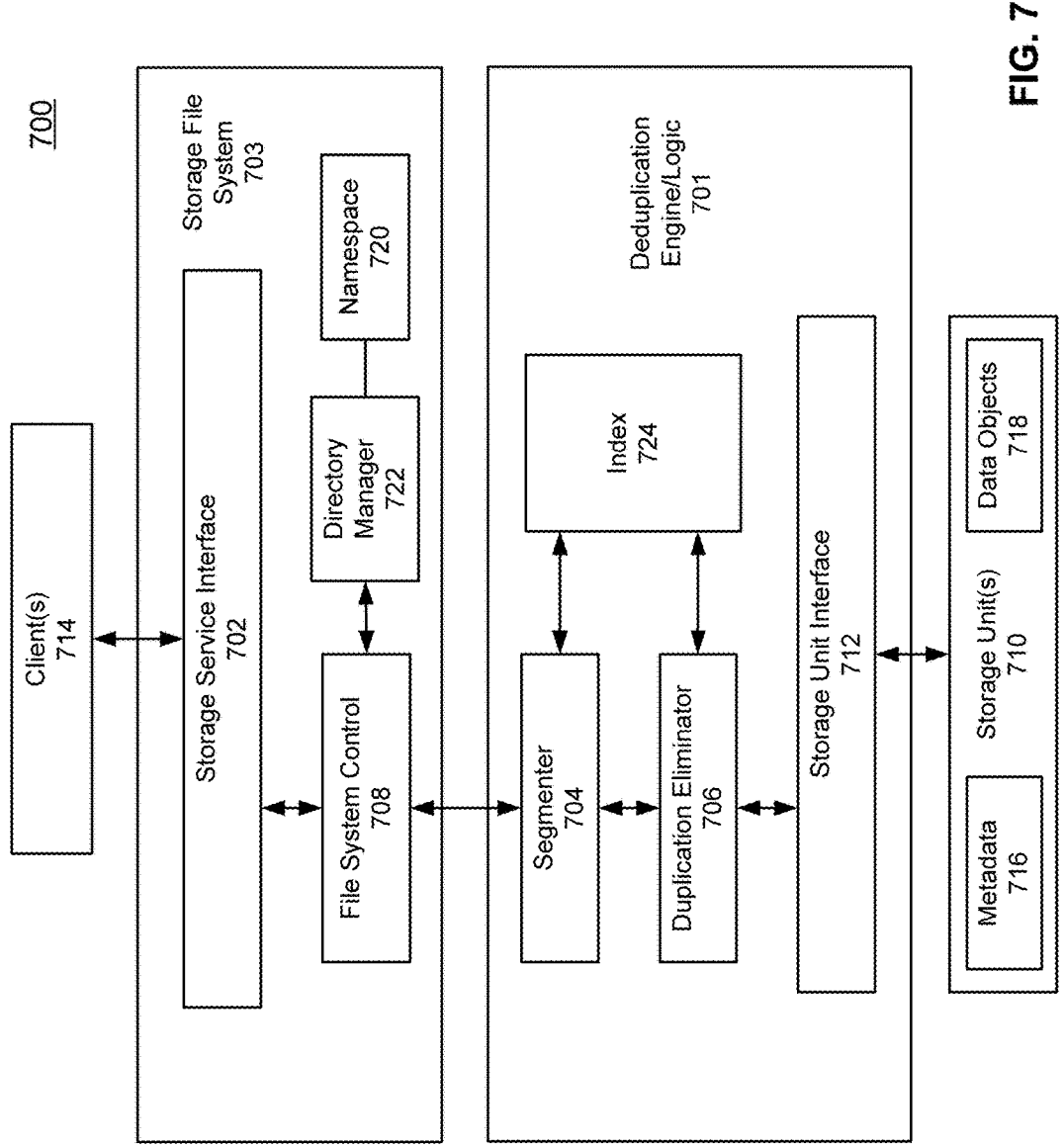
FIG. 7 is a block diagram illustrating a deduplicated storage system according to one embodiment of the invention.

FIG. 7 is a block diagram illustrating a deduplication storage system according to one embodiment of the invention. For example, deduplication storage system 700 may be implemented as part of a deduplication storage system as described above, such as the deduplication storage system as a client and/or a server described above. In one embodiment, storage system 700 may represent a file server (e.g., an appliance used to provide network attached storage (NAS) capability), a block-based storage server (e.g., used to provide storage area network (SAN) capability), a unified storage device (e.g., one which combines NAS and SAN capabilities), a near-line storage device, a direct attached storage (DAS) device, a tape backup device, or essentially any other type of data storage device. Storage system 700 may have a distributed architecture, or all of its components may be integrated into a single unit. Storage system 700 may be implemented as part of an archive and/or backup system, or a disaster recovery system, such as a deduplicating storage system available from EMC® Corporation of Hopkinton, Mass.

In one embodiment, storage system 700 includes deduplication logic 701 interfacing one or more clients 714, via file system 703, with one or more storage units 710 storing metadata 716 and data objects 718. Clients 714 may be any kinds of clients, such as a client application, backup software, a garbage collector, or a storage management function, located either locally or remotely over a network. A network may be any type of networks such as a local area network (LAN), a wide area network (WAN) such as the Internet, a corporate intranet, a metropolitan area network (MAN), a storage area network (SAN), a bus, or a combination thereof, wired and/or wireless.

Storage devices or units 710 may be implemented locally (e.g., single node operating environment) or remotely (e.g., multi-node operating environment) via an interconnect, which may be a bus and/or a network (e.g., a storage network). In one embodiment, one of storage units 710 operates as an active storage to receive and store external or fresh user data from a client (e.g., an end-user client or a primary storage system associated with one or more end-user clients), while the another one of storage units 710 operates as a target storage unit to periodically archive data from the active storage unit according to an archiving policy or scheme.

Storage units 710 may be, for example, conventional magnetic disks, optical disks such as CD-ROM or DVD based storage, magnetic tape storage, magneto-optical (MO) storage media, solid state disks, flash memory based devices, or any other type of non-volatile storage devices suitable for storing large volumes of data. Storage units 710 may also be combinations of such devices. In the case of disk storage media, the storage units 710 may be organized into one or more volumes of redundant array of inexpensive disks (RAID). Data stored in the storage units may be stored in a compressed form (e.g., lossless compression: HUFFMAN coding, LEMPEL-ZIV WELCH coding; delta encoding: a reference to a segment plus a difference; etc.). In one embodiment, different storage units may use different compression methods (e.g., main or active storage unit from other storage units, one storage unit from another storage unit, etc.).

The metadata, such as metadata 716, may be stored in at least some of storage units 710, such that files can be accessed independent of another storage unit. Metadata of each storage unit includes enough information to provide access to the files it contains. In one embodiment, metadata may include fingerprints or representatives contained within data objects 718, where a data object may represent a data segment (also referred to as a data chunk), a compression region (CR) of one or more data segments, or a container of one or more CRs. Fingerprints are mapped to a particular data object via metadata 716, enabling the system to identify the location of the data object containing a data segment represented by a particular fingerprint. A fingerprint may be generated based on at least a portion of a data segment, for example, by applying a predetermined mathematical algorithm (e.g., hash function) to at least a portion of the content of the data segment. When an active storage unit fails, metadata contained in another storage unit may be utilized to recover the active storage unit. When one storage unit is unavailable (e.g., the storage unit has failed, or is being upgraded, etc.), the system remains up to provide access to any file not stored in the failed storage unit. When a file is deleted, the metadata associated with the files in the system is updated to reflect that the file has been deleted.

In one embodiment, metadata 716 may include a file name, a storage unit identifier (ID) identifying a storage unit in which the segments associated with the file name are stored, reconstruction information for the file using the segments, and any other appropriate metadata information. Metadata 716 may further include a segment ID, a segment sketch, a hash of a segment, an encrypted hash of a segment, random data, or any other appropriate metadata. In some embodiments, metadata associated with a segment is used to identify identical and/or similar data segments. The stored metadata enables a faster identification of identical and/or similar data segments as an ID and/or sketch (e.g., a set of values characterizing the segment) do not need to be recomputed for the evaluation of a given incoming data segment.

In one embodiment, a segment ID includes one or more deterministic functions of a data segment (also referred to as a data segment), one or more hash functions of a data segment, random data, or any other appropriate data segment ID. In various embodiments, a data segment sketch includes one or more deterministic functions of a data segment, one or more hash functions of a data segment, one or more functions that return the same or similar value for the same or similar data segments (e.g., a function that probably or likely returns a same value for a similar data segment), or any other appropriate data segment sketch. In various embodiments, sketch function values are determined to be similar using one or more of the following methods: numeric difference, hamming difference, locality-sensitive hashing, nearest-neighbor-search, other statistical methods, or any other appropriate methods of determining similarity. In one embodiment, sketch data includes one or more data patterns characterizing a segment. For example, a sketch may be generated by applying one or more functions (e.g., hash functions) on a segment and a subset of the results of the functions performed on the segment (e.g., a number of results, for example the ten lowest results or the ten highest results) are selected as a sketch.

In one embodiment, a copy of the metadata is stored on a storage unit for files stored on a storage unit so that files that are stored on the storage unit can be accessed using only the information stored on the storage unit. In one embodiment, a main set of metadata information can be reconstructed by using information of other storage units associated with the storage system in the event that the main metadata is lost, corrupted, damaged, etc. Metadata for a storage unit can be reconstructed using metadata information stored on a main storage unit or other storage unit (e.g., replica storage unit). Metadata information further includes index information (e.g., location information for segments in storage units, identifying specific data objects).

In one embodiment, file system 703 includes file service interface 702, file system control logic 708, directory manager 722, and namespace 720. Deduplication logic 701 includes segmenter 704 (also referred to as a segmenting module or unit), duplicate eliminator 706, and storage unit interface 712. File system control 708 receives a file or files (or data item(s)) via file service interface 702, which may be part of a file system namespace 720 of file system 703 associated with the deduplication logic 701. The file system namespace 720 refers to the way files are identified and organized in the system. An example is to organize the files hierarchically into directories or folders, which may be managed by directory manager 722. File service interface 712 supports a variety of protocols, including a network file system (NFS), a common Internet file system (CIFS), a direct access file system (DAFS), Hadoop distributed file system (HDFS), and a virtual tape library interface (VTL), etc.

The file(s) is/are processed by segmenter 704 and file system control 708. Segmenter 704, also referred to as a content store, breaks the file(s) into variable-length segments based on a variety of rules or considerations. For example, the file(s) may be broken into segments by identifying segment boundaries. Segment boundaries may be determined using file boundaries, directory boundaries, byte counts, content-based boundaries (e.g., when a hash of data in a window is equal to a value), or any other appropriate method of determining a boundary. Reconstruction of a data block, data stream, file, or directory includes using one or more references to the one or more segments that originally made up a data block, data stream, file, or directory that was/were previously stored.

In some embodiments, segments are segmented by identifying segment boundaries that are content-based, such as, for example, a hash function is applied to values of data within a sliding window through the data stream or block and when the hash function is equal to a value (or equal to one of several values) then a segment boundary is identified. In various embodiments, segment boundaries are identified using content based functions operating on a sliding window within a data stream or block that have a minimum or maximum or other value or any other appropriate content based segmenting algorithm. In various embodiments, segments include fixed-length segments, variable length segments, overlapping segments, non-overlapping segments, segments with a minimum size, segments with a maximum size, or any other appropriate segments. In various embodiments, segments include files, groups of files, directories, a portion of a file, a portion of a data stream with one or more boundaries unrelated to file and/or directory boundaries, or any other appropriate segment.

In one embodiment, a segment boundary is determined using a value of a function calculated for multiple windows within a segmentation window. Values are computed that are associated with candidate boundaries within the segmentation window. One of the candidate boundaries is selected based at least in part on a comparison between two or more of the computed values. In one embodiment, a segmentation window can be determined by determining a first location corresponding to a minimum segment length and determining a second location corresponding to a maximum length, where data within the segmentation window is considered the segment from the first location to the second location.

Determining a boundary can include determining multiple windows within the segmentation window. Each window corresponds to a location within the segmentation window and is associated with a candidate boundary. In one embodiment, a function is then evaluated for each window. The function has as its inputs one or more data values of the window. In one embodiment, the function includes a hash function, such as, for example, SHA-1 (Secure Hash Algorithm 1), SHA-256, SHA-384, SHA-512, MD5 (Message-Digest algorithm 5), RIPEMD-160 (RACE Integrity Primitives Evaluation Message Digest 160-bit version), a Rabin hash, a fingerprint, a CRC (Cyclic Redundancy Check), a sum, an XOR, or any other appropriate function to distinguish a window. After the function values are generated for all windows, a boundary is selected based at least in part on the values that were generated, for example, the location corresponding to an extrema of a function value of all values generated, the location corresponding to the minimum value of all values generated is selected, the location corresponding to the maximum value of all values generated is selected, the location corresponding to a value with the longest run of 1 bits in its value of all values generated is selected, or the location corresponding to a value with the most 1 bits in its value of all values generated is selected. If there is tie for the value, criteria of selecting the location that maximizes or minimizes the segment length could be adopted.

In one embodiment, file system control 708, also referred to as a file system manager, processes information to indicate the segment(s) association with a file. In some embodiments, a list of fingerprints is used to indicate segment(s) associated with a file. File system control 708 passes segment association information (e.g., representative data such as a fingerprint) to index 724. Index 724 is used to locate stored segments in storage units 710 via storage unit interface 712. In one embodiment, index 724 may include multiple entries, each entry corresponding one of the deduplicated segments. Each entry maps a representative or fingerprint of a deduplicated segment to a storage location identifier identifying a storage location storing the corresponding deduplicated segment. In one embodiment, each entry of index 724 maps a fingerprint of a segment to a container identifier identifying a container that contains the corresponding segment.

In one embodiment, index 724 includes a persistent hash-table of segment-IDs keyed either by the digest of the data stored in the segment or by the deduplication key of the data stored in the segment. The index 724 need not contain entries for every data segment in the deduplication domain, but the effectiveness of deduplication is a function of the number of entries stored in the index 724. Deduplication of data happens in two logically distinct operations: detection and remapping. The detection operation identifies blocks containing the same data. The remapping operation updates address maps that record physical locations of logical units of data so that a single block of data is shared by multiple logical units (LUNs) or by multiple positions within the same LUN. Detection is accomplished by building a database (e.g., index 724) that maintains a digest (e.g., SHA, checksum) and a deduplication key for each data block. When two data blocks have the same digest they have a sufficiently high probability of containing the same data to warrant a bit-for-bit comparison to confirm they are exact duplicates. Remapping leverages dynamic block-mapping technology of a file system mapping driver. A file system allows dynamic manipulation of the address maps that connects LUN's logical address space to its physical address space.

Duplicate eliminator 706, also referred to as a segment store, identifies whether a newly received segment has already been stored in storage units 710. In the event that a segment has already been stored in storage unit(s), a reference to the previously stored segment is stored, for example, in a segment tree associated with the file, instead of storing the newly received segment. A segment tree of a file may include one or more nodes and each node represents or references one of the deduplicated segments stored in storage units 710 that make up the file. Segments are then packed by a container manager (which may be implemented as part of storage unit interface 712) into one or more storage containers stored in storage units 710. The deduplicated segments may be further compressed into one or more CRs using a variation of compression algorithms, such as a Lempel-Ziv algorithm before being stored. A container may contain one or more CRs and each CR may contain one or more deduplicated segments (also referred to deduplicated segments). A container may further contain the metadata such as fingerprints, sketches, type of the data segments, etc. that are associated with the data segments stored therein.

When a file is to be retrieved, file service interface 702 is configured to communicate with file system control 708 to identify appropriate segments stored in storage units 710 via storage unit interface 712. Storage unit interface 712 may be implemented as part of a container manager. File system control 708 communicates (e.g., via segmenter 704) with index 724 to locate appropriate segments stored in storage units via storage unit interface 712. Appropriate segments are retrieved from the associated containers via the container manager and are used to construct the requested file. The file is provided via interface 702 in response to the request. In one embodiment, file system control 708 utilizes a tree (e.g., a segment tree obtained from namespace 720) of content-based identifiers (e.g., fingerprints) to associate a file with data segments and their locations in storage unit(s). In the event that a segment associated with a given file or file changes, the content-based identifiers will change and the changes will ripple from the bottom to the top of the tree associated with the file efficiently since the appropriate content-based identifiers are easily identified using the tree structure.

In one embodiment, storage system 700 may be used as a tier of storage in a storage hierarchy that comprises other tiers of storage. One or more tiers of storage in this hierarchy may utilize different kinds of storage devices and/or may be optimized for different characteristics such as random update performance. Files are periodically moved among the tiers based on data management policies to achieve a cost-effective match to the current storage requirements of the files. For example, a file may initially be stored in a tier of storage that offers high performance for reads and writes. As the file ages, it may be moved into a tier of storage according to one embodiment of the invention. In various embodiments, tiers include different storage technologies (e.g., tape, hard drives, semiconductor-based memories, optical drives, etc.), different locations (e.g., local computer storage, local network storage, remote network storage, distributed storage, cloud storage, archive storage, vault storage, etc.), or any other appropriate storage for a tiered data storage system.

Note that some or all of the components as shown and described above (e.g., deduplication logic 701) may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into a dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

FIG. 8 is a block diagram illustrating an example of a data processing system which may be used with one embodiment of the invention. For example, system 800 may represents any of data processing systems described above performing any of the processes or methods described above. System 800 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 800 is intended to show a high level view of many components of the computer system. However, it is to be understood that additional components may be present in certain implementations and furthermore, different arrangement of the components shown may occur in other implementations. System 800 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 800 includes processor 801, memory 803, and devices 805-808 via a bus or an interconnect 810. Processor 801 may represent a single processor or multiple processors with a single processor core or multiple processor cores included therein. Processor 801 may represent one or more general-purpose processors such as a microprocessor, a central processing unit (CPU), or the like. More particularly, processor 801 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 801 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 801, which may be a low power multi-core processor socket such as an ultra-low voltage processor, may act as a main processing unit and central hub for communication with the various components of the system. Such processor can be implemented as a system on chip (SoC). Processor 801 is configured to execute instructions for performing the operations and steps discussed herein. System 800 may further include a graphics interface that communicates with optional graphics subsystem 804, which may include a display controller, a graphics processor, and/or a display device.

Processor 801 may communicate with memory 803, which in one embodiment can be implemented via multiple memory devices to provide for a given amount of system memory. Memory 803 may include one or more volatile storage (or memory) devices such as random access memory (RAM), dynamic RAM (DRAM), synchronous DRAM (SDRAM), static RAM (SRAM), or other types of storage devices. Memory 803 may store information including sequences of instructions that are executed by processor 801, or any other device. For example, executable code and/or data of a variety of operating systems, device drivers, firmware (e.g., input output basic system or BIOS), and/or applications can be loaded in memory 803 and executed by processor 801. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 800 may further include IO devices such as devices 805-808, including network interface device(s) 805, optional input device(s) 806, and other optional IO device(s) 807. Network interface device 805 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 806 may include a mouse, a touch pad, a touch sensitive screen (which may be integrated with display device 804), a pointer device such as a stylus, and/or a keyboard (e.g., physical keyboard or a virtual keyboard displayed as part of a touch sensitive screen). For example, input device 806 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 807 may include an audio device. An audio device may include a speaker and/or a microphone to facilitate voice-enabled functions, such as voice recognition, voice replication, digital recording, and/or telephony functions. Other IO devices 807 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 807 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 810 via a sensor hub (not shown), while other devices such as a keyboard or thermal sensor may be controlled by an embedded controller (not shown), dependent upon the specific configuration or design of system 800.

To provide for persistent storage of information such as data, applications, one or more operating systems and so forth, a mass storage (not shown) may also couple to processor 801. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 801, e.g., via a serial peripheral interface (SPI). This flash device may provide for non-volatile storage of system software, including a basic input/output software (BIOS) as well as other firmware of the system.

Storage device 808 may include computer-accessible storage medium 809 (also known as a machine-readable storage medium or a computer-readable medium) on which is stored one or more sets of instructions or software (e.g., module, unit, and/or logic 828) embodying any one or more of the methodologies or functions described herein. Module/unit/logic 828 may also reside, completely or at least partially, within memory 803 and/or within processor 801 during execution thereof by data processing system 800, memory 803 and processor 801 also constituting machine-accessible storage media. Module/unit/logic 828 may further be transmitted or received over a network via network interface device 805.

Computer-readable storage medium 809 may also be used to store the some software functionalities described above persistently. While computer-readable storage medium 809 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Module/unit/logic 828, components and other features described herein can be implemented as discrete hardware components or integrated in the functionality of hardware components such as ASICS, FPGAs, DSPs or similar devices. In addition, module/unit/logic 828 can be implemented as firmware or functional circuitry within hardware devices. Further, module/unit/logic 828 can be implemented in any combination hardware devices and software components.

Note that while system 800 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A machine-readable non-transitory storage medium having instructions therein, which when executed by a machine, cause the machine to perform operations comprising:

identifying, at a first source server, one or more data units to be replicated to a target server, the one or more data units being stored at the first source server;

identifying, at the first source server, a second source server for replicating at least a subset of the one or more data units from the second source server to the target server, the subset of the one or more data units to be replicated from the second source server being stored at both the first source server and the second source server, the second source server coupled with the target server, the second source sever capable of performing data replication to the target server;

sending a replication request from the first source server to the second source server, the replication request identifying the one or more data units for replication;

receiving a reply to the replication request from the second source server, the reply indicating the subset of the one or more data units are replicated from the second source server, wherein remaining ones of the one or more data units are not replicated from the second source server for the replication request; and sending, subsequent to receiving the reply, at least one of the remaining ones of the one or more data units from the first source server to the target server for the replication of the one or more data units without sending the subset of the one or more data units indicated in the reply, wherein replication of a portion of the subset of the one or more data units from the second source server to the target server takes place concurrently with replication of a portion of the remaining ones of the one or more data units from the first source server to the target server for the replication of the one or more data units.

2. The machine-readable non-transitory storage medium of claim 1, wherein a plurality of source servers are separately coupled to the target server, the source servers including the second source server, each source server capable of performing the data replication to the target server, wherein the identification comprises:

maintaining a topology map dynamically during runtime, the topology map identifying the source servers, wherein the identification of the second source server is based on the topology map.

3. The machine-readable non-transitory storage medium of claim 2, wherein the source servers include a master server monitoring runtime states of the source servers and wherein the topology map is received from the master server.

4. The machine-readable non-transitory storage medium of claim 2, the identification further comprising:

selecting one or more eligible source servers for the replication of the one or more data units from the plurality of source servers based on the topology map and wherein the selected one or more eligible source servers include the second source server.

5. The machine-readable non-transitory storage medium of claim 4, wherein the topology map indicates whether a source server is currently performing the data replication to the target server, and wherein an eligible source server is not currently performing the data replication to the target server.

6. The machine-readable non-transitory storage medium of claim 4, wherein the topology map indicates a connection bandwidth associated with each source server with the target server, and wherein the eligible source servers are selected according to the connection bandwidth associated with each source server.

7. The machine-readable non-transitory storage medium of claim 6, wherein one source server is not selected if the one source server is associated with a connection bandwidth smaller than a threshold value.

8. The machine-readable non-transitory storage medium of claim 7, wherein the first source server is coupled with the target server via a network connection having a particular connection bandwidth and wherein the threshold value is determined based on the particular connection bandwidth.

9. The machine-readable non-transitory storage medium of claim 4, the operations further comprising:
determining an ordering relationship among the eligible source servers according to amounts of network bandwidth associated with the eligible source servers to the target server, wherein the second source server is associated with a highest amount of network bandwidth among the eligible source servers according to the ordering relationship.

10. The machine-readable non-transitory storage medium of claim 9, wherein a third source server is ordered next to the second source server among the eligible source servers according to the ordering relationship, the operations further comprising:
sending, in response to the reply received from the second source server, an updated replication request from the first source server to the third source server, wherein the updated replication request identifying the remaining ones of the one or more data units for replication, the updated replication request without identifying the subset of the one or more data units indicated in the reply from the second source server; and
receiving a separate reply from the third source server, the separate reply indicating one or more of the remaining ones of the one or more data units are replicated from the third source server, wherein the one or more of the remaining ones of the one or more data units do not include the at least one of the remaining ones of the one or more data units sent from the first source server to the target server.

11. The machine-readable non-transitory storage medium of claim 4, wherein the identification further comprises:
generating a fingerprint describing the one or more data units to be replicated to the target server;
sending inquiry messages to the eligible source servers, each inquiry message identifying the one or more data units for replication; and
collecting response messages from the eligible source servers in response to the inquiry messages, each response message received from one of the eligible source servers, the response message indicating which of the one or more data units are available in the one eligible source server, wherein a particular response message received from the second source server indicates the subset of the one and more data units are available in the second source server.

12. The machine-readable non-transitory storage medium of claim 11, further comprising:
identifying one or more of the eligible source servers to replicate separate portions of the one or more data units, wherein the identified eligible source servers include the second source server to replicate one of the separate portions of the one or more data units includes the subset of the one or more data units.

13. The machine-readable non-transitory storage medium of claim 12, further comprising:
sending multiple replication requests to the identified source servers to separately replicate the separate portions of the one or more data units, the multiple replication requests including the replication request to the second source server.

14. The machine-readable non-transitory storage medium of claim 13, wherein the multiple replication requests are sent concurrently.

15. The machine-readable non-transitory storage medium of claim 13, further comprising:
receiving multiple replies in response to the multiple replication requests from the identified source servers, the multiple replies including the reply from the second source server; and
determining which of the one or more data units to be replicated from the first source server, wherein the at least one of the remaining ones of the one or more data units are determined to be replicated from the first source server.

16. The machine-readable non-transitory storage medium of claim 1, wherein the one or more data units are stored in a storage component coupled with the first source server and wherein each data unit represents a fixed sized partition of the storage component.

17. A computer implemented method comprising:
identifying, at a first source server, one or more data units to be replicated to a target server, the one or more data units being stored at the first source server;
identifying, at the first source server, a second source server for replicating at least a subset of one or more data units from the second source server to the target server, the subset of the one or more data units to be replicated from the second source server being stored at both the first source server and the second source server, the second source server coupled with the target server, the second site sever performing data replication to the target server;
sending a replication request from the first source server to the second source server, the replication request identifying the one or more data units for replication;
receiving a reply to the replication request from the second source server, the reply indicating the subset of the one or more data units are replicated from the second source server, wherein remaining ones of the one or more data units are not replicated from the second source server for the replication request; and
sending, subsequent to receiving the reply, at least one of the remaining ones of the one or more data units from the first source server to the target server for the replication of the one or more data units without sending the subset of the one or more data units indicated in the reply,
wherein replication of a portion of the subset of the one or more data units from the second source server to the target server takes place concurrently with replication of a portion of the remaining ones of the one or more data units from the first source server to the target server for the replication of the one or more data units.

18. The computer implemented method of claim 17, wherein a plurality of source servers are separately coupled to the target server, the source servers including the second source server, each source server performing the data replication to the target server, wherein the identification comprises:
maintaining a topology map dynamically during runtime, the topology map identifying the source servers, wherein the identification of the second source server is based on the topology map.

19. The computer implemented method of claim 18, the identification further comprising:
  selecting one or more eligible source servers for the replication of the one or more data units from the plurality of source servers based on the topology map and wherein the selected one or more eligible source servers include the second source server.

20. The computer implemented method of claim 19, the operations further comprising:
  determining an ordering relationship among the eligible source servers according to amounts of network bandwidth associated with the eligible source servers to the target server, wherein the second source server is associated with a highest amount of network bandwidth among the eligible source servers according to the ordering relationship.

21. The computer implemented method of claim 20, wherein a third source server is ordered next to the second source server among the eligible source servers according to the ordering relationship, the operations further comprising:
  sending, in response to the reply received from the second source server, an updated replication request from the first source server to the third source server, wherein the updated replication request identifying the remaining ones of the one or more data units for replication, the updated replication request without identifying the subset of the one or more data units indicated in the reply from the second source server; and
  receiving a separate reply from the third source server, the separate reply indicating one or more of the remaining ones of the one or more data units are replicated from the third source server, wherein the one or more of the remaining ones of the one or more data units do not include the at least one of the remaining ones of the one or more data units sent from the first source server to the target server.

22. The computer implemented method of claim 19, wherein the identification further comprises:
  generating a fingerprint describing the one or more data units to be replicated to the target server;
  sending inquiry messages to the eligible source servers, each inquiry message identifying the one or more data units for replication; and
  collecting response messages from the eligible source servers in response to the inquiry messages, each response message received from one of the eligible source servers, the response message indicating which of the one or more data units are available in the one eligible source server, wherein a particular response message received from the second source server indicates the subset of the one and more data units are available in the second source server.

23. A computer system comprising:
  a memory storing executable instructions;
  a network interface coupled to one or more source servers and a target server in a cross-site configuration;
  a storage device storing data units;
  a processor coupled to the memory, the network interface and the storage device, the processor to execute the executable instructions from the memory to
  identify one or more data units to be replicated to a target server, the one or more data units being stored at the computer system;
  identify a separate source server in the cross-site configuration for replicating a subset of the one or more data units from the separate source server to a target server, the subset of the one or more data units to be replicated from the separate source server being stored at both the computer system and the separate source server, the separate source capable of performing data replication to the target server,
  send a replication request to the separate source server, the replication request identifying the one or more data units for replication,
  receive a reply to the replication request from the separate source server, the reply indicating the subset of the one or more data units are replicated from the separate source server, wherein remaining ones of the one or more data units are not replicated from the separate source server for the replication request, and
  send, subsequent to receiving the reply, at least one of the remaining ones of the one or more data units to the target server for the replication of the one or more data units without sending the subset of the one or more data units indicated in the reply,
  wherein replication of a portion of the subset of the one or more data units from the second source server to the target server takes place concurrently with replication of a portion of the remaining ones of the one or more data units from the first source server to the target server for the replication of the one or more data units.

* * * * *